(12) United States Patent
Rakes

(10) Patent No.: US 8,692,889 B2
(45) Date of Patent: Apr. 8, 2014

(54) IMAGE MAGNITUDE DIFFERENTIAL BASED SYSTEM AND METHOD FOR TRACKING COOPERATIVE, NON-INCANDESCENT SOURCES

(75) Inventor: Alan A. Rakes, Palm Bay, FL (US)

(73) Assignee: DRS RSTA, Inc., Dallas, TX (US)

( * ) Notice: Subject to any disclaimer, the term of this patent is extended or adjusted under 35 U.S.C. 154(b) by 427 days.

(21) Appl. No.: 12/726,191

(22) Filed: Mar. 17, 2010

(65) Prior Publication Data
US 2011/0228099 A1   Sep. 22, 2011

(51) Int. Cl.
*H04N 5/225* (2006.01)
(52) U.S. Cl.
USPC .......................................................... 348/169
(58) Field of Classification Search
USPC .......................................................... 348/169
See application file for complete search history.

(56) References Cited

U.S. PATENT DOCUMENTS

| | | | |
|---|---|---|---|
| 1,388,932 A | 8/1921 | Centervall | |
| 2,362,832 A | 11/1944 | Land | |
| 2,421,012 A | 5/1947 | Chew | |
| 2,930,894 A | 3/1960 | Bozeman | |
| 3,567,163 A | 3/1971 | Kepp et al. | |
| 3,796,396 A | 3/1974 | Crovella | |
| 4,038,547 A | 7/1977 | Hoesterey | |
| 4,397,429 A | 8/1983 | Fouilloy | |
| 4,710,028 A | 12/1987 | Grenier et al. | |
| 4,933,541 A | 6/1990 | Dufour | |
| 4,939,369 A * | 7/1990 | Elabd | 250/332 |
| 4,967,979 A | 11/1990 | Balstad | |
| 4,988,058 A | 1/1991 | Dirscherl et al. | |
| 5,062,586 A | 11/1991 | Hobson et al. | |
| 5,074,491 A | 12/1991 | Tyson | |
| 5,124,547 A * | 6/1992 | Melman | 250/226 |
| 5,258,618 A * | 11/1993 | Noble | 250/332 |
| 5,332,176 A | 7/1994 | Wootton et al. | |
| 5,434,612 A | 7/1995 | Nettleton et al. | |
| 5,706,054 A * | 1/1998 | Hannah | 375/240.12 |
| 6,123,287 A | 9/2000 | Bozeman et al. | |
| 6,260,792 B1 | 7/2001 | Zwirn et al. | |
| 6,677,590 B2 * | 1/2004 | Nakauchi et al. | 250/339.15 |
| 7,032,856 B2 | 4/2006 | Wells | |
| 7,582,853 B2 | 9/2009 | Teneze | |
| 2002/0154293 A1 | 10/2002 | Wells et al. | |
| 2008/0112594 A1 | 5/2008 | Williams et al. | |
| 2009/0012585 A1 * | 1/2009 | Karni et al. | 607/88 |

* cited by examiner

*Primary Examiner* — Dave Czekaj
*Assistant Examiner* — Leron Beck
(74) *Attorney, Agent, or Firm* — Kilpatrick Townsend & Stockton LLP

(57) ABSTRACT

A system and method for tracking a cooperative, non-incandescent source may include collecting scene images of a scene that includes the cooperative, non-incandescent source and background clutter. First and second scene images of the scene may be generated over distinct spectral bands. The first and second scene images may be imaged onto respective first and second focal plane arrays. In one embodiment, the imaging may be substantially simultaneous. The first and second scene image frame data respectively generated by the first and second focal plane arrays may be processed to produce resultant scene image frame data. The scene image frame data may result in reducing magnitude of scene image frame data representative of the background clutter more than magnitude of scene image frame data representative of the cooperative, non-incandescent source.

26 Claims, 6 Drawing Sheets

IMAGE MAGNITUDE DIFFERENTIAL BASED SYSTEM AND METHOD FOR TRACKING COOPERATIVE, NON-INCANDESCENT SOURCES

BACKGROUND

Current tube-launched, optically-tracked, wire-guided (TOW) missiles are tracked using technology developed in the 1960s. Historically, TOW missile trackers use only two elements configured in an L-shaped pattern with a lens in front that nutates scene images in a circular pattern across the detectors. A xenon beacon on the rear of the TOW missile is modulated at a much higher frequency than the nutation frequency of the tracker, which, by temporal frequency filtering, allows the beacon to be separated from background clutter on the detector. The relative phase or angle of the nutation circle of the beacon as it crosses each detector relative to a reference signal allows the determination of the azimuth and elevation position of the beacon. The azimuth and elevation signals are then provided to guidance algorithms to steer the missile to the desired target.

The basic tracking technology described above is still in use in all of U.S. inventory TOW missile systems. Despite the accuracy of the TOW missile, the technology is also prone to jamming when the modulation frequency of the beacon is known. The only current workaround to xenon jamming or multiple missiles in the field-of-view of the missile tracker is the use of the TOW II missile, where an additional forward looking infrared (FLIR) tracker and infrared beacon is utilized in conjunction with the xenon beacon tracker.

In the mid-1990s, a number of xenon beacon wire-guided European missiles began conversion to using CCD imaging based trackers also known as CCD localizers. Imaging trackers have the advantage of a natural resistance to jamming once tracking has been initiated due to the fact that there is spatial separation between the signal being tracked and the jamming signal. These imaging trackers use a single CCD array and a single or dual field-of-view (FOV) lens to image the xenon beacon onto the array. Some variance may synchronize the imager frame rate to the high frequency of the xenon modulation (e.g., greater than one kilohertz) or operate at a very high frame rate near the modulation frequency of the xenon beacon.

The use of single focal plane array (FPA) imaging solutions that have been used heretofore have disadvantages that are difficult to overcome. First, the use of a single FPA must either be synchronized to the xenon beacon pulse rate in order to differentiate the xenon beacon from background clutter or the single FPA must operate at a very high frame rate (i.e., greater than one kilohertz) in order to detect the modulation frequency of the xenon beacon in order to identify the beacon from background clutter. Since current U.S. TOW missiles operate in a completely open-loop form with the xenon beacon, there is no signal available without a complete redesign of the missile itself to allow for synchronizing the single FPA. Also, very high angular resolution for azimuth and elevation determination of the beacon necessitates large format focal plane arrays, where greater than one mega pixels is preferable. However, these FPAs are not conducive to high frame rates, which makes the use of a single FPA solution difficult to use for tracking TOW missile beacons.

SUMMARY

To overcome the problems of existing TOW missile trackers and other systems that track cooperative, non-incandescent sources, the principles of the present invention provide for utilizing a pair of solid-state imaging focal plane arrays to collect scene image frames that may be used in generating accurate azimuth and elevation data for guiding a TOW missile to its target. The two FPAs may collect scene image frames of a scene over different wavelength bands, and generate scene image frame data that may be processed to minimize background clutter. In one embodiment, the processing may include subtracting the two scene image frames collected by the two FPAs that results in the cooperative, non-incandescent source being prominent and minimizes background clutter in a resultant scene image frame. Through the use of multiple FPAs, the imaging tracker is more robust to jamming sources than existing trackers.

One embodiment of a system for tracking a cooperative, non-incandescent source may include a pair of focal plane arrays. An optical imaging system may be configured to (i) collect a scene image of a scene within a field-of-view of said optical imaging system, the scene image may include the cooperative non-incandescent source and background clutter, (ii) generate a first scene image over a first spectral band and a second scene image over a second spectral band, and (iii) image the first scene image onto a first focal plane array that generates first scene image frame data and the second scene image onto a second focal plane array that generates second scene image frame data. A processing unit may be configured to process the first scene image frame data generated by the first focal plane array and the second scene image frame data generated by the second focal plane array to produce a resultant scene image frame that provides a differential between the magnitude of scene image frame data representative of the background clutter and the magnitude of scene image frame data representative of the cooperative, non-incandescent source.

One embodiment of a method for tracking a cooperative, non-incandescent source may include collecting scene images of a scene that includes the cooperative, non-incandescent source and background clutter. A first scene image may be generated over a first spectral band and a second scene image over a second spectral band. The first scene image may be imaged onto a first focal plane array and the second scene image may be imaged onto a second focal plane array. In one embodiment, the imaging of the first and second scene images onto the first and second focal plane arrays may be performed substantially simultaneously. The first scene image frame data generated by the first focal plane array and the second scene image frame data generated by the second focal plane array may be processed to produce a resultant scene image frame that provides a differential between the magnitude of scene image frame data representative of the background clutter and the magnitude of scene image frame data representative of the cooperative, non-incandescent source.

BRIEF DESCRIPTION

Illustrative embodiments of the present invention are described in detail below with reference to the attached drawing figures, which are incorporated by reference herein and wherein.

DETAILED DESCRIPTION

Figure 1:
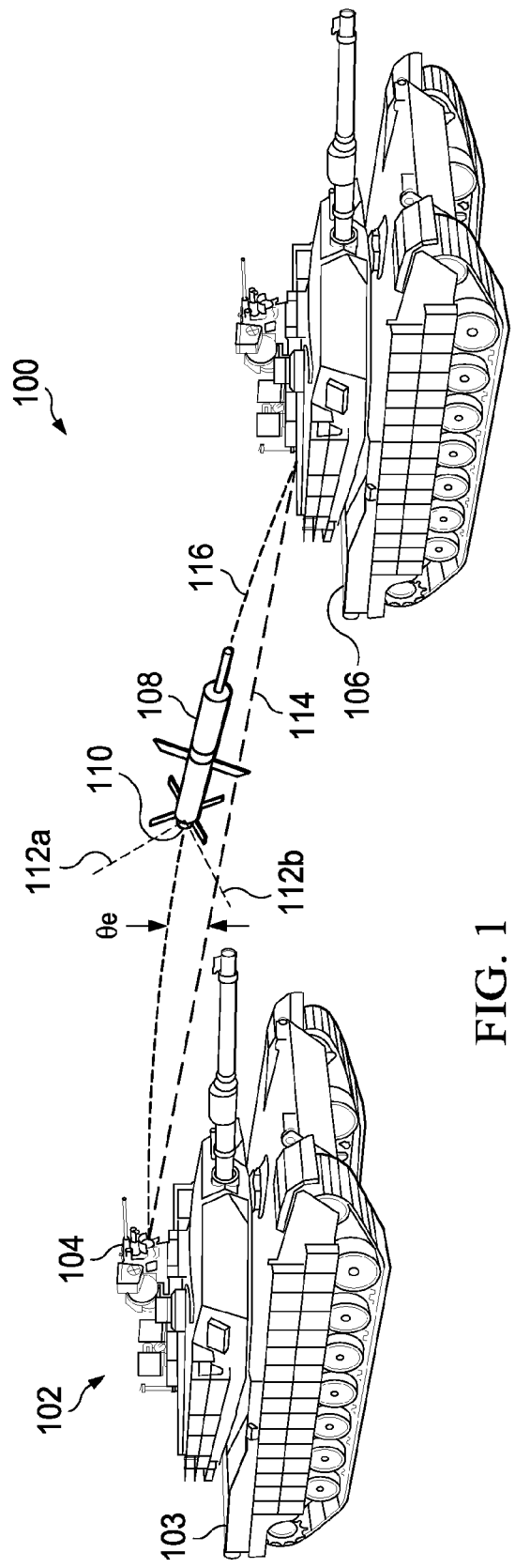
FIG. 1 is an illustration of an illustrative environment in which a TOW missile that includes a rear-mounted beacon is launched at and guided into a target.

With regard to FIG. 1, an illustrative weapons system 102 mounted to a launch vehicle 103 includes a TOW missile tracker system 104. The TOW missile tracker system 104 includes an optical sensor system that tracks a target 106 and TOW missile 108. The TOW missile 108 includes a beacon 110 mounted to the tail end of the TOW missile 108, as understood in the art. The beacon 110 is a cooperative, non-incandescent source of light. The term "cooperative" means that the type of source being tracked is known. The source may include a specific type of LED light source, xenon, krypton, argon, neon, or any other type of gas discharge source. The beacon 110 may generate a spectral wavelength (e.g., light) having a particular illumination angle disposed between illumination angle lines 112a-112b that, when the TOW missile 108 is flying, enables the TOW missile tracking system 104 to identify location of the TOW missile 108 with respect to the target 106 to guide the TOW missile 108 into the target 106. As shown, a line-of-sight line 114 is straight line from the TOW missile tracker system 104 to the target 106 along which the TOW missile 108 is optimally guided to fly when traveling to the target 106. Flight path 116 extending from the TOW missile tracking system 104 to the TOW missile 108 is an actual flight path 116 that the TOW missile is traveling. An error angle $\theta_e$ may be calculated between the line-of-sight line 114 and TOW missile flight path 116 and used in providing the TOW missile navigation instructions to correct the path of the TOW missile 108 to travel along the line-of-sight line 114 to reach the target 106.

Figure 2:
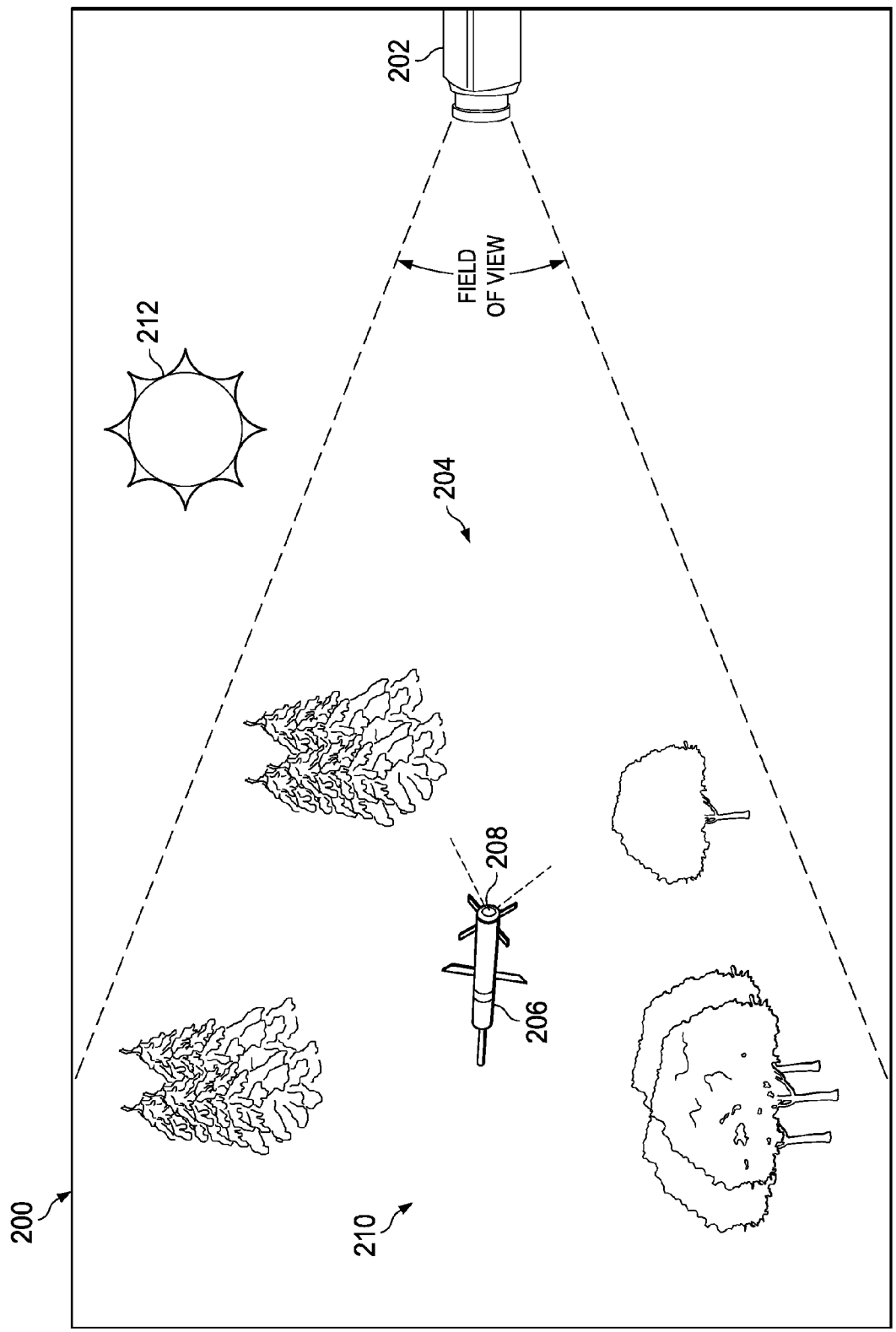
FIG. 2 is an illustrative environment in which a TOW missile is launched at and guided into a target in an environment in which solar background clutter exists in the field-of-view of a sensor of a TOW missile tracker that is tracking the missile and target.

With regard to FIG. 2, an illustrative environment 200 in which a TOW missile system is used is shown. A TOW missile tracker 202 that views a scene 204 may capture scene image frames of the scene 204. During operation, a TOW missile 206 having a cooperative, non-incandescent source 208, such as a xenon beacon, on the tail end of the TOW missile 206 may be captured by the TOW missile tracker 202 for tracking and guiding the TOW missile 206 to a target, as described in FIG. 1. Background clutter 210 that is in the scene 204 may also be captured while the TOW missile tracker 202 is tracking the cooperative, non-incandescent source 208. The background clutter 210 may include solar background clutter that is generated by the sun 212 or other illumination source. As understood in the art, if the background clutter 210 is not attenuated or otherwise compensated for, the cooperative, non-incandescent source 208 can become difficult to track, especially at long distances.

Figure 3:
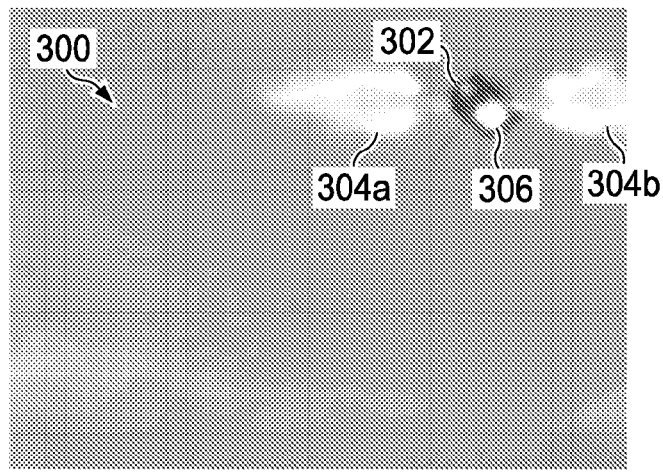
FIG. 3 is an illustration of an illustrative TOW missile having a tail beacon that is used for tracking and guiding the missile to its target.

With regard to FIG. 3, an illustrative environment 300 in which a TOW missile 302 is fired is shown. The TOW missile 302 is shown to have exhaust plumes 304a and 304b that extend to the left and right of the TOW missile 302 and a beacon 306 that is mounted to the tail end of the TOW missile 302. Because the beacon 306 has a particular spectral pattern and operates at a certain pulse rate, a TOW missile tracking system may be configured to track the beacon 306 while using the plumes 304a and 304b to assist the TOW missile tracker system in acquiring the beacon 306. The tracker may image the scene 300 using one or more focal plane arrays that provide an image of the scene 300 as opposed to using conventional detectors configured in a L-shaped pattern with a nutating lens for imaging the scene onto the L-shaped detector. The use of one or more focal plane arrays improves robustness for reducing counter-measures. The use of multiple plane arrays improves the ability to attenuate background clutter data, as further described herein.

Figure 4:
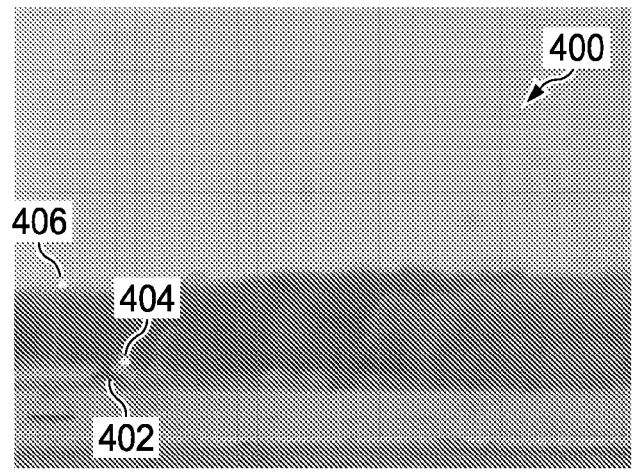
FIG. 4 is an illustration of an illustrative environment in which a beacon counter-measure is in a field-of-view of a tracker that is guiding a missile with a beacon on its tail end to its target.

With regard to FIG. 4, an illustrative scene 400 is shown to include a target 402 and beacon 404 that is mounted to the tail end of a TOW missile traveling toward the target 402. A counter-measure beacon 406 is also shown in the scene 400 that is attempting to cause the TOW missile tracker to become confused and provide incorrect guidance instructions to the TOW missile so as to miss the target 402. Through the use of focal plane array(s) in the TOW missile tracker, the beacon counter-measure 406 may be ignored as not being the beacon 404 that was originally acquired and identified as being attached to the TOW missile being tracked.

Figure 5:
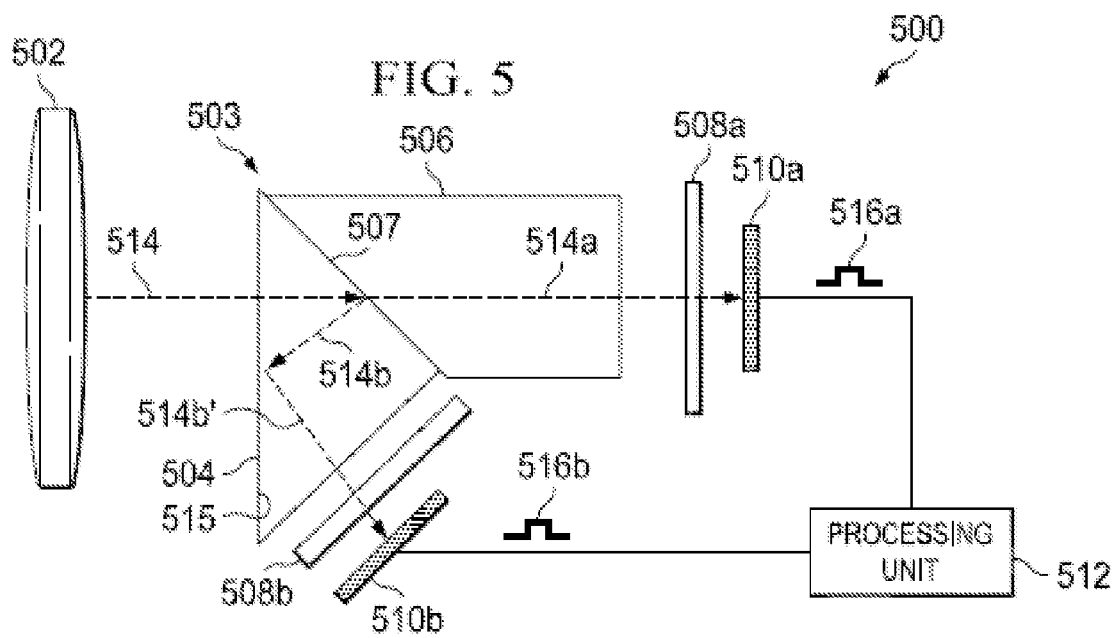
FIG. 5 is a block diagram of an optical system that is configured to collect a scene image and image distinct wavelength bands of the scene image onto two different focal plane arrays for use in tracking a cooperative, non-incandescent source.

With regard to FIG. 5, a block diagram of a conceptual top-view of an illustrative optical imaging system 500 of a TOW missile tracker or other system is shown. The optical imaging system 500 may include a lens 502 that is used to image a scene. The lens 502 may be configured as a single lens, compound lens, multiple lenses, and/or other optical elements (e.g., collimator). The lens 502 is in optical communication with a beam splitter 503 that may be configured as a prism 504 and optical component 506. The optical component 506 may be connected to the prism 504 along a surface 507. The beam splitter 503 may be configured to spectrally separate light by transmitting one portion of the light spectrum and reflecting another portion of the light spectrum. Alternatively, the beam splitter 503 may be configured as a single element that separates different percentages of light intensity (e.g., 50%/50%) using a simple rectangular optical component or a square beam splitter, as understood in the art. In one embodiment, the beam splitter 503 is configured to cause multiple reflections therein, which results in a scene image being oriented the same as the image that passes through the beam splitter 503 without reflection. However, a single reflection beam splitter may also be used and additional processing techniques could be performed to compensate for having a difference in orientation of the images being output from the beam splitter.

Two optical bandpass filters 508a and 508b may be in optical communication with the beam splitter 503 and configured to filter different spectrums of wavelengths. The optical bandpass filters 508a and 508b may be dichroic. In one embodiment, the first optical bandpass filter 508a filters out optical signals outside of a first wavelength range and optical bandpass filter 508b filters out optical signals outside of a second wavelength range. The wavelength ranges may be set such that energy from a cooperative, non-incandescent source is significantly higher over one of the wavelength ranges than the other to allow the optical imaging system 500 to discriminate the source from background clutter, as further described herein.

Two focal plane arrays 510a and 510b may be in optical communication with the spectral bandpass filters 508a and 508b, respectively. The focal plane arrays 510a and 510b may have substantially identical configurations and functionality so that resulting scene images that are illuminated onto and captured by each of the respective focal plane arrays 510a and 510b may be processed by a processing unit 512. In one embodiment, the FPAs may be high resolution charge-coupled devices (CCDs), CMOS, InGaAs, or any other type of FPA array may alternatively be utilized. The resolution may include 1024×768 pixels, 640×480 pixels, or other pixel count depending on resolution, field-of-view, angular, or any other imaging or processing requirement. In addition, the two FPAs 510a and 510b may be synchronized using a common clock to ensure each pixel read from FPA 510a is read at the same time as a corresponding pixel on FPA 510b in order for the scene image data to be temporally synchronized and spatially registered. In other words, a scene image that is imaged onto the two FPAs 510a and 510b is matched to the same pixels albeit different spectral ranges or magnitudes of brightness depending on the configuration of the beam splitter 503. For example, a top left pixel of FPA 510a (e.g., pixel (1,1)) is imaged with the same portion of the scene image as a top left pixel of FPA 510b (e.g., pixel (1,1)), and a bottom right pixel of FPA 510a (e.g., pixel (640,480)) is imaged with the same portion of the scene image as bottom right pixel of FPA 510b (e.g., pixel (640,480)). If a single reflection were to occur in the beam splitter 503, then the scene images that were imaged onto the two FPAs 510a and 510b would be inverted left-right from one another and the processing unit 512 would have to associate the scene image frame data that contains the same portions of the scene image. It should be noted that so long as the scene images that are imaged onto the two FPAs 510a and 510b are substantially the same size or can be processed to provide correspondence between scene image areas or pixel locations, then the principles of the present invention may be utilized.

The processing unit 512 may be configured of one or more computer processors, including general purpose processors, digital signal processors, or any other processor, as understood in the art. The processing unit 512 may alternatively be formed of a hardware processor circuit (i.e., no software) for performing the processing functionality.

In operation, the lens 502 receives a scene image in the form of electromagnetic radiation (e.g., light waves) and passes the scene image in the form of a light beam 514 toward the beam splitter 503. As the beam splitter 503 passes the light beam 514 through the prism 504, the light beam 514 reaches the surface between the prism 504 and optical component 506. As understood in the art, the light beam 514 is separated into multiple light beams 514a and 514b having different spectral bands, where light beam 514a passes through the surface 507 into the optical component 506. Light beam 514b is reflected from the surface 507 to another surface 515, which may have a reflective coating for reflecting light beam 514b' toward the optical filter 508b. As previously described, by using a double reflection in the beam splitter 503, the scene image that is imaged onto the focal plane array 510b is in the same orientation as that imaged onto the focal plane array 510a. The beam splitter 503 may be configured to separate spectral wavelengths and operates as a certain level of optical filtering. The additional use of optical bandpass filters 508a and 508b results in a design that provides for narrow wavelength bandpass filtering. That is, beam splitter 503 and optical filter 508a combine to result in a narrow bandpass filter that images both solar reflected radiation as well as any desired emission peak or combination of peaks in the desired source spectrum, whereas beam splitter 503 and optical filter 508b combine to result in a narrow bandpass filter that images the cooperative, non-incandescent source at a minimum energy level while the solar background energy level is relatively the same as seen through beam splitter 503 and optical filter 508a.

Each of the focal plane arrays 510a and 510b may be operated at the same frame rate so that scene image frame data 516a and 516b generated by each respective FPA 510a and 510b is synchronized and communicated to the processing unit 512. The scene image frame data 516a and 516b may be communicated as digital signals, as understood in the art. The processing unit 512 may be configured to receive the scene image frame data 516a and 516b, and process the scene image frame data 516a and 516b to produce resultant scene image data that reduces magnitude of scene image frame data representative of the background clutter more than magnitude of scene image frame data representative of the cooperative, non-incandescent source. In other words, the background clutter is reduced or eliminated, and may appear as being black, while the beacon remains visible in the resultant scene image frame data (see FIG. 7C). In one embodiment, the processing may include performing a subtraction of the scene image frame data 516a and 516b on a pixel-by-pixel basis. In one embodiment, the frame rate is 30 hertz and the integration time is one-sixteenth of a second, which results in collecting 90 pulses from the cooperative, non-incandescent source that strobes at 1.5 kilohertz (i.e., 1,500/16=90 pulses).

As previously described, the optical filters 508a and 508b may be bandpass filters over different wavelength ranges. In one embodiment, the wavelength ranges of the optical bandpass filters 508a and 508b may be between approximately 780 nanometers and approximately 800 nanometers, and approximately 900 nanometers and approximately 915 nanometers, respectively. Between the 780 and 800 nanometer spectrum range, a xenon beacon produces approximately 10% energy, while between 900 and 915 nanometers, the xenon beacon produces approximately 90% energy. Over those same wavelength bands, solar radiation produces approximately 50% energy in each spectral band. By subtracting the energy captured over the different wavelength bands, the xenon beacon results in approximately 80% (i.e., 90%-40%), while the solar background clutter results in approximately 0% (i.e., 50%-50%). It should be understood that the principles of the present invention provide for any wavelength range filtering in which the cooperative, non-incandescent source produces a significantly higher amount of energy in one wavelength range than in a different wavelength range. In one embodiment, rather than using optical filtering for generating a desired emission peak or combination of peaks in the desired spectrums, setting different integration times in the different wavelength bands may be utilized to improve background clutter cancellation or attenuation over each of the different wavelength bands. It should further be understood that the processing unit may perform any other processing that results in a cancellation or attenuation of background clutter. However, subtracting the two scene image frame data 516a and 516b is an efficient technique for reducing background clutter, while maintaining the cooperative, non-incandescent source (see FIG. 7C).

Figure 6:
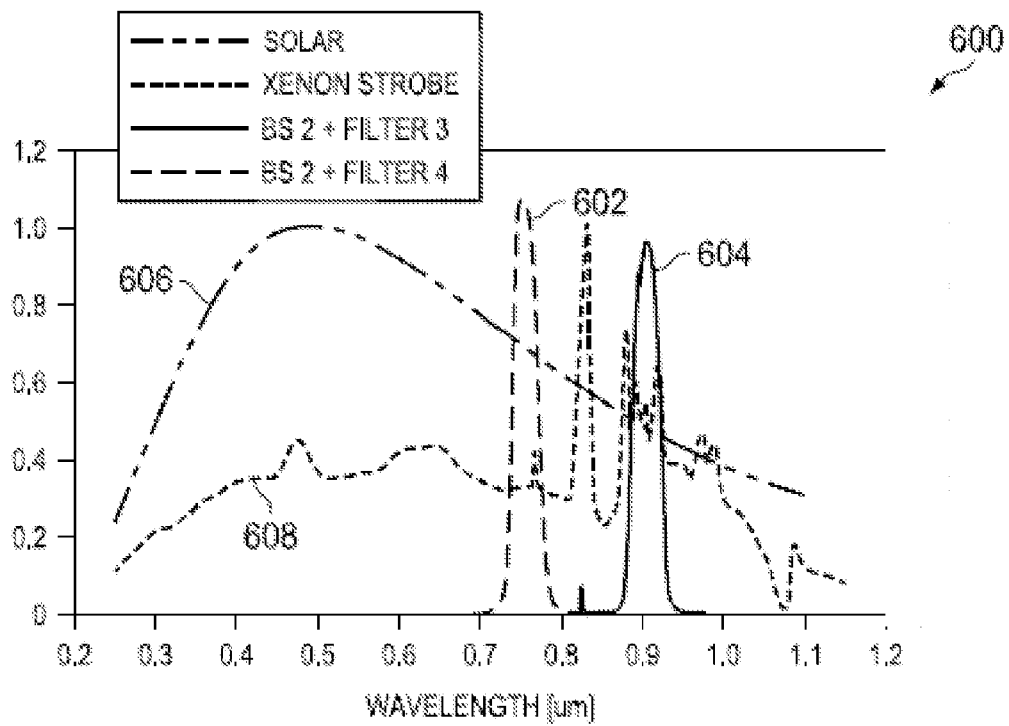
FIG. 6 is a graph of an illustrative spectrum having two wavelength or spectral bands that are used for tracking a xenon beacon in an environment in which solar background clutter exists.

With regard to FIG. 6, a graph 600 of illustrative optical signals of a scene image are provided along with two bandpass filter representations. A first bandpass filter representation 602 shows the bandpass filter spectral band extending from approximately 780 nanometers to approximately 800 nanometers, and a second bandpass filter representation 604 shows the bandpass filter spectral band extending from approximately 850 nanometers to approximately 950 nanometers. A solar background clutter signal 606 is shown to be a smooth curve that passes through the bandpass filter representations 602 and 604, and a xenon beacon signal 608 also passing through the bandpass filter representations 602 and 604. The energy of the solar background clutter signal 606 is evenly distributed in both of the bandpass filter spectral bands (i.e., approximately 50% in each) and the energy of the xenon beacon signal 608 is much higher in the second bandpass filter spectral band than the first bandpass filter spectral band.

Figure 7A:
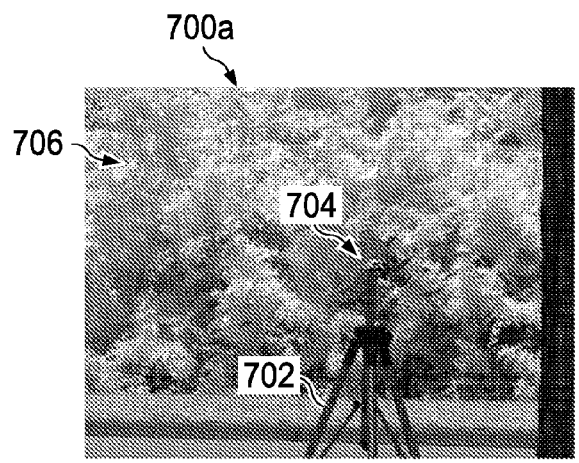
FIGS. 7A-7C are illustrations of a scene in which an LED mounted on a tripod is tracked using the optical system of FIG. 5 and spectral discrimination of FIG. 6 for canceling solar background clutter data while preserving image data of the LED.
Figure 7B:
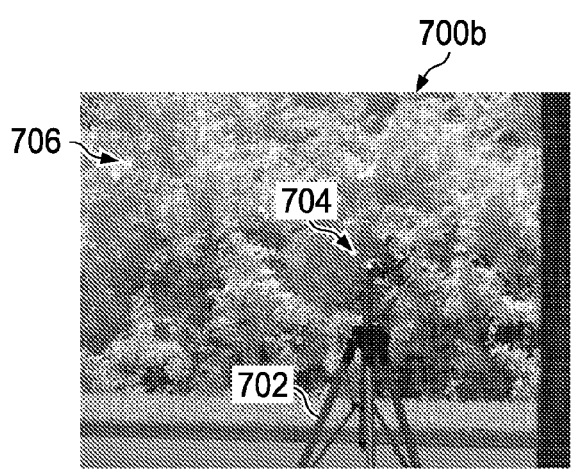
Figure 7C:
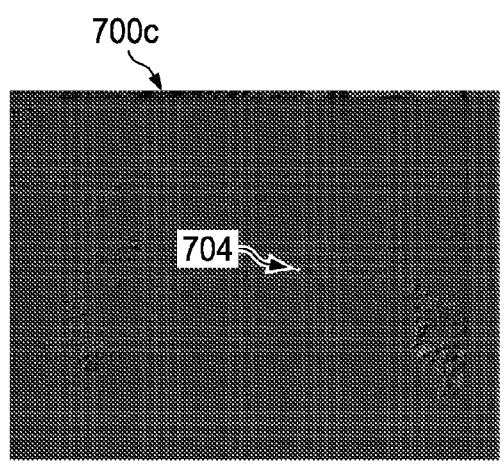

With regard to FIGS. 7A and 7B, illustrative scene image frames 700a and 700b include a tripod 702 on which an LED 704 is mounted. In addition, the scene image frames 700a and 700b include trees 706 and other outdoor environment items for purposes of demonstrating how the background clutter is eliminated or attenuated as compared to a cooperative, non-incandescent source. As shown in FIG. 7A, the LED appears to be OFF in FIG. 7A and ON in FIG. 7B. However, the LED 704 is actually on in both of the two scene image frames 700a and 700b as the two scene image frames are substantially simultaneously collected from the same scene. In being substantially simultaneously collected, the two image frames 700a and 700b may be collected close enough in time so that the background of the scene does not appreciably change from one to the next. For example, the two image frames 700a and 700b should be close enough in time so that if wind is blowing leaves, that the leaves do no appreciably change position between the two image frames 700a and 700b, thereby allowing for the background to be effectively canceled out. The reason for the LED 704 appearing to be OFF in FIG. 7A is that the LED 704 produces very little energy over the wavelength band of the first bandpass filter. In other words, the spectral filtering, which ranges over different wavelength bands, causes the LED 704 to appear OFF in the spectral or wavelength band of FIG. 7A and ON in the spectral or wavelength band of FIG. 7B. As shown in FIG. 7C, the LED 704 is shown because of the differential in energy output over the two different spectral bands while the background clutter that has been cancelled or otherwise attenuated by a processing unit subtracting the scene image data representative of the scene image frames 700a and 700b over the different spectral bands, as shown in scene image frame 700c. It should be understood that the image may be inverted such that the background clutter results in being substantially white while the image of the LED 704 results in being dark.

Figure 8:
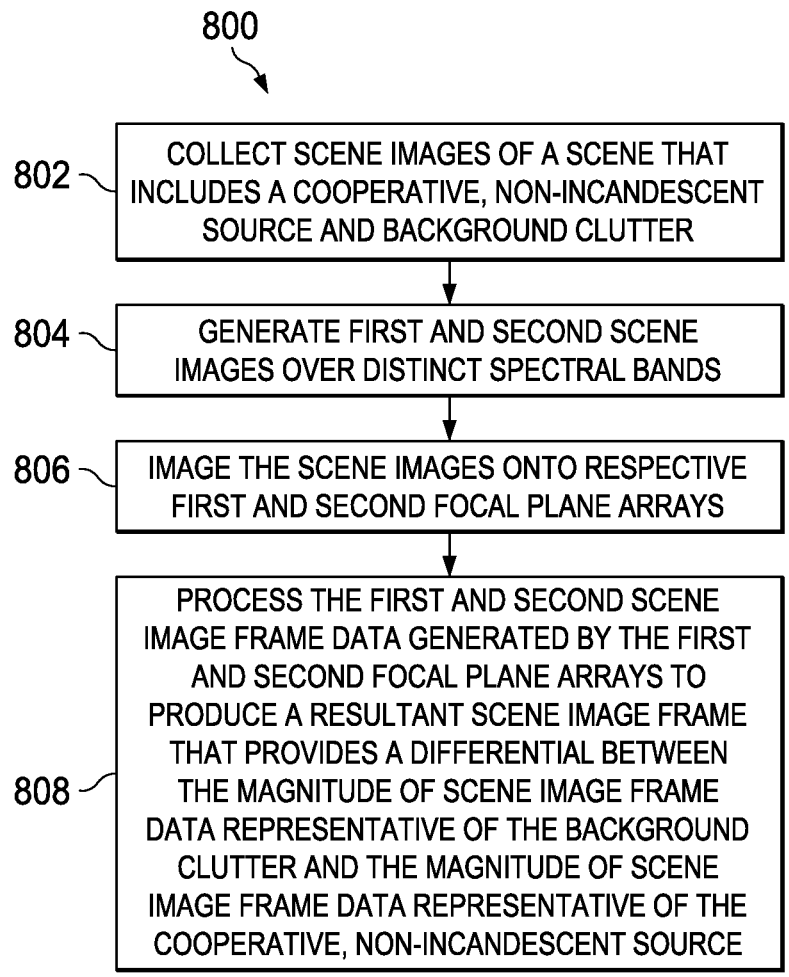
FIG. 8 is a flow diagram of an illustrative process for tracking a cooperative, non-incandescent source in an environment of background clutter.

With regard to FIG. 8, a flow diagram 800 of an illustrative process for collecting and processing scene data is shown. The process 800 starts at step 802, where scene image frames are collected of a scene that includes a cooperative, non-incandescent source and background clutter at step 802. At step 804, first and second scene images are generated over distinct spectral bands. At step 806, the scene images are imaged onto respective first and second focal plane arrays. In being imaged, the scene images are illuminated onto the focal plane arrays based on a field-of-view of an optical imaging system that is collecting the scene images to generate scene image frames. In one embodiment, the scene images may be substantially simultaneously collected. At step 808, the first scene image frame data generated by the first focal plane array and the second scene image frame data generated by the second focal plane array may be processed to produce a resultant scene image frame that provides a differential between the magnitude of scene image frame data representative of the background clutter and the magnitude of scene image frame data representative of the cooperative, non-incandescent source.

Although the description is primarily focused on the TOW missile tracker system, it should be understood that the principles of the present invention are applicable for other military and non-military systems that are used to track cooperative, non-incandescent sources.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for tracking a cooperative, non-incandescent source coupled to a missile, said system comprising:
   a pair of focal plane arrays;
   an optical imaging system configured to:
   (i) collect a scene image of a scene within a field-of-view of said optical imaging system, the scene image including the cooperative non-incandescent source and background clutter,
   (ii) generate a first scene image over a first spectral band and a second scene image over a second spectral band, and
   (iii) image the first scene image onto a first focal plane array that generates first scene image frame data and the second scene image onto a second focal plane array that generates second scene image frame data; and
   a processing unit configured to process the first scene image frame data generated by the first focal plane array and the second scene image frame data generated by the second focal plane array to produce a resultant scene image frame that provides a differential between the magnitude of scene image frame data representative of the background clutter and the magnitude of scene image frame data representative of the cooperative, non-incandescent source, wherein the production of the resultant scene image frame includes subtracting light energy captured over the first spectral band from light energy captured over the second spectral band;
   wherein light energy of the cooperative, non-incandescent source captured over the second spectral band exceeds light energy of the cooperative, non-incandescent source captured over the first spectral band; and
   wherein a magnitude of light energy of the cooperative non-incandescent source captured over the first spectral band subtracted from light energy of the cooperative non-incandescent light source captured over the second spectral band exceeds a magnitude of light energy of the background clutter captured over the first spectral band subtracted from light energy of the background clutter captured over the second spectral band.

2. The system according to claim 1, wherein the imaging of the first scene image onto the first focal plane array and the imaging of the second scene image onto the second focal plane array occurs simultaneously.

3. The system according to claim 1, wherein said optical imaging system includes a beam splitter configured to pass a first spectral range of light of the scene image and perform at least one reflection of a second spectral range of light of the scene image.

4. The system according to claim 3, wherein the beam splitter performs two reflections of the second spectral range of light of the scene image.

5. The system according to claim 3, wherein said optical imaging system includes a first optical filter disposed between the beam splitter and the first focal plane array, wherein the first optical filter filters the first spectral range of light of the scene image to generate a first filtered image of the scene image over a first spectral band and a second optical filter disposed between the beam splitter and the second focal plane array, wherein the second optical filter filters the second spectral range of light of the scene image to generate a second filtered image of the scene image over a second spectral band.

6. The system according to claim 5, wherein the first optical filter is configured as a bandpass filter over a range of shorter wavelengths than the second optical filter.

7. The system according to claim 6, wherein the wavelength range of the first optical filter is between approximately 780 nanometers and approximately 800 nanometers, and wherein the wavelength range of the second optical filter is between approximately 900 nanometers and approximately 915 nanometers.

8. The system according to claim 5, wherein said first optical filter and said second optical filter are dichroic.

9. The system according to claim 1, wherein the differential reduces the magnitude of the scene image frame data representative of the background clutter more than the magnitude of the scene image frame data representative of the cooperative, non-incandescent source.

10. The system according to claim 1, wherein said processing unit, in processing the first scene image frame data and the second scene image frame data, is configured to subtract the second scene image frame data from the first scene image frame data.

11. The system according to claim 10, wherein processing of the first scene image frame data and the second scene image frame data is on a pixel-by-pixel basis, wherein each pixel of first scene image frame data from the first focal plane array is subtracted from a pixel of second scene image frame data from the second focal plane array having a corresponding pixel position.

12. The system according to claim 1, wherein said optical imaging system includes a beam splitter configured to pass a first percentage of light of the scene image and perform at least one reflection of the remaining percentage of the light of the scene image.

13. The system according to claim 1, wherein integration times of the first scene image frame data and the second scene image frame data are established to cause solar background clutter to be eliminated in the resultant scene image frame data by said processing unit processing the first and second scene image frame data.

14. A method implemented by a computer processor for tracking a cooperative, non-incandescent source, said method comprising:
    collecting, by a first focal plane array and a second focal plane array, scene images of a scene that includes the cooperative, non-incandescent source and background clutter;
    generating, by the first focal plane array, a first scene image over a first spectral band and
    generating, by the second focal plane array, a second scene image over a second spectral band;
    imaging the first scene image onto the first focal plane array and the second scene image onto the second focal plane array; and
    processing, by the computer processor, the first scene image frame data generated by the first focal plane array and the second scene image frame data generated by the second focal plane array to produce a resultant scene image frame that provides a differential between the magnitude of scene image frame data representative of the background clutter and the magnitude of scene image frame data representative of the cooperative, non-incandescent source, wherein the production of the resultant scene image frame includes subtracting light energy captured over the first spectral band from light energy captured over the second spectral band
    wherein light energy of the cooperative, non-incandescent source captured over the second spectral band exceeds light energy of the cooperative, non-incandescent source captured over the first spectral band; and
    wherein a magnitude of light energy of the cooperative non-incandescent source captured over the first spectral band subtracted from light energy of the cooperative non-incandescent light source captured over the second spectral band exceeds a magnitude of light energy of the background source captured over the first spectral band subtracted from light energy of the background source captured over the second spectral band.

15. The method according to claim 14, wherein the imaging of the first scene image onto the first focal plane array and the imaging of the second scene image onto the second focal plane array occurs simultaneously.

16. The method according to claim 14, further comprising:
    splitting light from a scene image into a first spectral range of light of the scene image and a second spectral range of light of the scene image; passing the first spectral range of light; and
    performing at least one reflection of the second spectral range of light of the scene image.

17. The method according to claim 16, wherein the performing includes performing two reflections of the second spectral range of light of the scene image.

18. The method according to claim 16, further comprising optically filtering the first spectral range of light of the scene image over a first spectral band and the second spectral range of light of the scene image over a second spectral band.

19. The method according to claim 18, wherein the optical filtering of the first spectral range of light of the scene image is performed as a bandpass filtering over a range of shorter wavelengths than optical filtering of the second spectral range of light of the scene image.

20. The method according to claim 19, wherein the wavelength range of the first optical filtering is between approximately 780 nanometers and approximately 800 nanometers, and wherein the wavelength range of the second optical filtering is between approximately 900 nanometers and approximately 915 nanometers.

21. The method according to claim 18, wherein the optical filtering includes performing optical filtering using dichroic optical filters.

22. The method according to claim 14, wherein the processing results in reducing the magnitude of the scene image frame data representative of the background clutter more than the magnitude of the scene image frame data representative of the cooperative, non-incandescent source.

23. The method according to claim 14, wherein processing the first scene image frame data and the second scene image frame data includes subtracting the second scene image frame data from the first scene image frame data.

24. The method according to claim 23, wherein processing of the first scene image frame data and the second scene image frame data is on a pixel-by-pixel basis, wherein each pixel of first scene image frame data from the first focal plane array is subtracted from a pixel of second scene image frame data the second focal plane array having a corresponding pixel position.

25. The method according to claim 14, further comprising: passing a first percentage of light of the scene image; imaging the first focal plane array with the first percentage of light of the scene image; performing at least one reflection of the remaining percentage of the light of the scene image; and imaging the second focal plane array with the remaining percentage of the light of the scene image.

26. The method according to claim 14, further comprising integrating the first scene image frame data and the second scene image frame data to cause solar background clutter to be eliminated in the resultant scene image frame data.

* * * * *